United States Patent [19]

Jager et al.

[11] Patent Number: 5,562,977
[45] Date of Patent: Oct. 8, 1996

[54] WATERPROOF, BREATHABLE RAINWEAR AND WATERPROOF ARTICLES OF FOAM PLASTIC

[75] Inventors: Jan Jager, Duiven; Cornelius M. F. Vrouenraets, Dieren; Henricus J. M. van de Ven, Arnhem, all of Netherlands

[73] Assignee: Akzo Nobel N.V., Arnhem, Netherlands

[21] Appl. No.: 233,662

[22] Filed: Apr. 26, 1994

[30] Foreign Application Priority Data

Apr. 28, 1993 [NL] Netherlands ............................ 9300723

[51] Int. Cl.$^6$ ............................ C08L 67/02; C08K 5/06; B32B 27/36
[52] U.S. Cl. .......................... 428/287; 428/213; 428/245; 428/246; 428/475.2; 428/913; 528/301; 528/343
[58] Field of Search ...................................... 428/245, 246, 428/475.2, 913, 213, 287, 483; 528/301, 343

[56] References Cited

U.S. PATENT DOCUMENTS

| | | | |
|---|---|---|---|
| 3,023,192 | 2/1962 | Shivers, Jr. | 260/75 |
| 3,775,374 | 11/1973 | Wolfe, Jr. | 260/75 R |
| 3,775,375 | 11/1973 | Wolfe, Jr. | 260/75 R |
| 4,493,870 | 1/1985 | Vrouenraets et al. | 428/245 |
| 4,725,481 | 2/1988 | Ostapchenko | 428/213 |
| 4,908,260 | 3/1990 | Dodia et al. | 428/215 |
| 5,114,784 | 5/1992 | Van de Ven et al. | 428/246 |

FOREIGN PATENT DOCUMENTS

| | | | |
|---|---|---|---|
| 341430 | 11/1989 | European Pat. Off. | B32B 5/22 |
| 365129 | 4/1990 | European Pat. Off. | C08L 67/02 |

OTHER PUBLICATIONS

Kirk–Othmer Encyclopedia of Chemical Technology 9: 232–241 (1966).
Research Disclosures, Aug. 1971, Product Licensing Index, pp. 63–69.

*Primary Examiner*—Patrick Ryan
*Assistant Examiner*—Rich Weisberger
*Attorney, Agent, or Firm*—Richard P. Fennelly; Louis A. Morris

[57] ABSTRACT

Disclosed is the use of a laminate of a textile material covered with a copolyetherester film having a water vapor transmission rate of at least 1000 g/m$^2$/day for the manufacture therefrom of waterproof rainwear, shoes, tents, and mattress covers, and for the complete covering therewith of molded articles of foam rubber for use in chairs or mattresses, the copolyetherester being composed of a plurality of recurrent intralinear long-chain ester units and short-chain ester units which are randomly joined head-to-tail through ester bonds, with at least 20 wt. % of the long-chain ester units being prepared from a long-chain glycol having a carbon to oxygen ratio in the range of 2.0 to 2.4, which glycol constitutes 15–45 wt. % of the copolyetherester, and with at least 70 wt. % of the short-chain ester units consisting of butylene naphthalate units constituting 20-80 wt. % of the copolyetherester. Compared with the known polyetherester-textile laminates, the claimed laminates exhibit surprisingly low permanent plastic deformation.

5 Claims, No Drawings

WATERPROOF, BREATHABLE RAINWEAR AND WATERPROOF ARTICLES OF FOAM PLASTIC

The invention pertains to the use of a laminate of a textile material covered with a copolyetherester film having a water vapor transmission rate of at least 1000 g/m²/day for the manufacture therefrom of waterproof rainwear, shoes, tents, and mattress covers, and for the complete covering therewith of molded articles of foam rubber for use in chairs or mattresses, the copolyetherester being composed of a plurality of recurrent intralinear long-chain ester units and short-chain ester units which are randomly joined head-to-tail through ester bonds, the long-chain ester units corresponding to the formula:

and the short-chain ester units corresponding to the formula:

where G is a divalent radical remaining after the removal of terminal hydroxyl groups from at least one long-chain glycol having a average molecular weight in the range of 600 to 4000 and an atomic ratio of carbon to oxygen in the range of 2.0 to 4.3, at least 20 wt. % of the long-chain glycol having a carbon to oxygen ratio in the range of 2.0 to 2.4, and 15–45 wt. % of said glycol being part of the copolyetherester, R is a divalent radical remaining after the removal of carboxyl groups from at least one dicarboxylic acid having a molecular weight of less than 300, and D is a divalent radical remaining after the removal of hydroxyl groups from at least one diol having a molecular weight of less than 250.

The use of a laminate of a textile material and a copolyetherester film of the aforementioned type for manufacturing rainwear or tents is known from U.S. Pat. No. 4,493,870, while a process for completely covering foam rubber articles with a laminate of the aforementioned type for use in chairs or mattresses is disclosed in U.S. Pat. No. 5,114,784. In the manufacture of the rainwear described in the former patent, use is made of textile material covered with a film of a copolyetherester of which the short-chain ester units entirely or substantially consist of butylene terephthalate units. However, this type of copolyetherester film has the drawback of suffering comparatively major permanent plastic deformation, which property renders this type of film less suitable for use in making more elastic rainwear, let alone waterproof shoes and breathable sportswear, such as is employed in jogging, wind surfing, and the like. A similar disadvantage applies to a process for completely covering foam plastic molded articles with a laminate of the aforementioned type for use in chairs or mattresses.

Waterproof rainwear, shoes, tents, mattress covers, and completely covered foam plastic molded articles according to the present invention do not suffer these drawbacks or suffer them to a far lesser extent.

The invention relates to the manufacture of waterproof rainwear, shoes, tents, mattress covers, or completely covered molded articles of the known type mentioned in the opening paragraph use is made of a copolyetherester where at least 70 mole % of the dicarboxylic acid employed consists of 2,6-naphthalene dicarboxylic acid or its ester forming equivalents and at least 70 mole % of the low molecular weight diol consists of 1,4-butane diol or its ester forming equivalents, with the sum of the mole percentage of dicarboxylic acid which is not 2,6-naphthalene dicarboxylic acid or its ester forming equivalents and the mole percentage of low molecular weight diol which is not 1,4-butane diol or its ester forming equivalents being not more than 30, and where the short-chain ester units make up 20–80 wt. % of the copolyetherester.

In view of the comparatively low melting point of copolyetheresters having a percentage of short-chain ester units <35 wt. %, it is preferred according to the invention to use copolyetheresters where the percentage of short-chain ester units is 35–80 wt. % of the copolyetherester.

When the requirements with regard to the elastic properties of the laminates according to the present invention are less strict, it is preferred, both in view of the mechanical properties of the films and in view of their manufacture, to have copolyetherester films made of copolyetheresters where the short-chain ester units make up 60–70 wt. % of the copolyetherester.

When the present laminates are used for the manufacture of sportswear and the like, preference is largely given to laminates having stretch properties, i.e., to copolyetherester laminates where not only the textile material has elastomeric properties but also the copolyetherester film. It has been found that the use of copolyetherester films made of copolyetheresters where the percentage of short-chain ester units is 25–60 wt. % can give surprisingly favorable results.

Suitable textile materials are those which are commonly employed to make rainwear, shoes, tents, mattress covers, chair upholstery, and the like. However, the now proposed copolyetherester films make it possible to also use more elastic materials, such as the well-known knitted fabrics with stretch properties used in sportswear and fabrics and such made of more elastic fibers, for instance polyurethane fibers.

As in the case of the known covering materials, as a rule, preference is given to knitted fabrics based on polyacrylonitrile, polyethylene terephthalate, polyamide-6 or -6,6, polypropylene, and the like, optionally combined with wool and/or cotton. In the case of use in rainwear, optimum results are generally obtained if the textile material is rendered hydrophobic. This is preferably done after lamination with the copolyetherester film.

Of course, the degree of water vapor permeability of the copolyetherester film is dependent not only on the composition of the copolyetherester but also on the film's thickness. At any chosen film thickness the water vapor permeability should always be at least 1000 g/m²/day. It has been found that very favorable results are obtained using a polymer film having a thickness in the range of 5 to 35 μm. Optimum results are obtained when the polymer film's thickness is in the range of 5 to 25 μm.

For the preparation of the copolyetheresters to be used in the manufacture of waterproof rainwear according to the present invention reference may be had to U.S. Pat. No. 3,775,375.

According to the invention, preference is given to copolyetheresters of which the short-chain ester units entirely or substantially consist of polybutylene naphthalate units. Films of these copolyetheresters are easy to prepare. Moreover, films of this material generally have better physical properties for the present use than films of copolyetheresters in which, say, 30% of the naphthalene dicarboxylic acid has been replaced with a different dicarboxylic acid. For special uses, replacement of a small percentage of the 1,4-butane diol with some other diol and/or replacement of naphthalene dicarboxylic acid with a different low molecular weight dicarboxylic acid may be of advantage. Included among the low molecular weight diols (other than 1,4-butane diol) which are converted into short-chain ester units are acyclic, alicyclic, and aromatic dihydroxy compounds. Preferred are diols having 2–15 carbon atoms, such as ethylene glycol, propylene glycol, isobutylene glycol, pentamethylene glycol, 2,2-dimethyl trimethylene glycol, hexamethylene glycol, and decamethylene glycol, dihydroxy cyclohexane, cyclohexane dimethanol, resorcinol, hydroquinone, and 1,5-dihydroxy naphthalene. Particular preference is given to aliphatic diols having 2–8 carbon atoms. Included among the bisphenols which can be used are bis(p-hydroxy)diphenyl, bis(p-hydroxyphenyl)methane, and bis(p-hydroxyphenyl)propane. Corresponding ester forming derivatives of diols are likewise suitable for use (e.g., epoxy ethane or ethylene carbonate may be used instead of ethylene glycol). The term "low molecular weight diols" refers to such corresponding ester forming derivatives, but with the molecular weight requirement relating to the diol as such and not to its derivatives.

The dicarboxylic acids (other than naphthalene dicarboxylic acid) which are converted with the aforementioned long-chain glycols and low molecular weight diols into copolyesters include aliphatic, cycloaliphatic or aromatic dicarboxylic acids having a molecular weight not higher than 300. The term "dicarboxylic acid" as employed here also refers to equivalents of dicarboxylic acids having two functional carboxyl groups and practically the same behavior as dicarboxylic acids in the conversion with glycols and diols to form copolyesters. These equivalents include esters and ester forming derivatives, such as the acid halides and anhydrides. The requirements regarding the molecular weight relate to the acid and not to its equivalent esters or ester forming derivatives. The dicarboxylic acids may contain randomly substituted groups or combinations which do not detrimentally affect copolyester formation or the use of the polymer in the elastomeric preparations according to the invention. The term "aliphatic dicarboxylic acids" as employed here refers to carboxylic acids having two carboxyl groups each attached to a saturated carbon atom. Aliphatic or cycloaliphatic acids having conjugated unsaturated bonds often cannot be used because of homopolymerization. However, some unsaturated acids, such as maleic acid, are utilizable. The term "aromatic dicarboxylic acids" as employed here refers to dicarboxylic acids having two carboxyl groups attached to a carbon atom in an isolated or fused benzene ring. It is not necessary for the two functional carboxyl groups to be attached to the same aromatic ring, and where there is more than one ring present, they can be joined by aliphatic or aromatic divalent radicals or by other divalent radicals such as —O — or —SO$_2$—. Preference is given to cyclohexane dicarboxylic acids and adipic acid.

The aromatic dicarboxylic acids suitable for use include terephthalic acid, phthalic acid, and isophthalic acid, dibenzoic acid, substituted dicarboxyl compounds having two benzene nuclei, such as bis(p-carboxyphenyl)methane, p-oxy(p-carboxyphenyl)benzoic acid, ethylene-bis(p-oxybenzoic acid), 1,5-naphthalene dicarboxylic acid, 2,7-naphthalene dicarboxylic acid, phenanthrene dicarboxylic acid, anthracene dicarboxylic acid, 4,4'-sulfonyl dibenzoic acid, and alkyl groups having 1–12 carbon atoms and ring substitution derivatives thereof, such as halo, alkoxy, and aryl derivatives. Further, use may be made of hydroxy acids such as p-(β-hydroxyethoxy)benzoic acid, providing an aromatic dicarboxylic acid is present also. According to the invention, it is of vital importance that at least 70 mole % of the short-chain ester units, and preferably 95–100%, are the same.

For the preparation of the copolyesters preference is given to aromatic dicarboxylic acids, more particularly those having 8–16 carbon atoms, notably the phenylene dicarboxylic acids, i.e., terephthalic acid, phthalic acid, and isophthalic acid. Preferably, the long-chain glycols are entirely made up of polyethylene oxide glycol. In some cases it may be desirable to employ random or block copolymers of epoxy ethane and minor amounts of a second epoxy alkane. It is preferred that the second monomer should constitute less than 40 mole % of the polyalkylene oxide glycols, more preferably, less than 20 mole %. As examples of suitable second monomers may be mentioned 1,2- and 1,3-epoxy propane, 1,2-epoxy butane, and tetrahydrofuran. Alternatively, use may be made of mixtures of polyethylene oxide glycol and a second polyalkylene oxide glycol, such as poly-1,2-propylene oxide glycol or polytetramethylene oxide glycol.

The polymers described herein can be made conveniently by a conventional ester interchange reaction. A preferred procedure involves heating the dimethyl ester of 2,6-naphthalene dicarboxylic acid with a long-chain glycol and a molar excess of butane diol in the presence of a catalyst at 150°–260° C., followed by distilling off the methanol formed by the interchange. Heating is continued until the methanol evolution is complete. Depending on temperature, catalyst, and diol excess, this interchange reaction is complete within a few minutes to a few hours. This procedure results in the preparation of a low molecular weight prepolymer, which can be converted into a high molecular weight copolyester by means of the method described below. Such prepolymers can also be prepared by a number of alternate esterification or ester interchange processes; for example, the long-chain glycol can be reacted with a high or low molecular weight short-chain ester homopolymer or copolymer in the presence of a catalyst until randomization occurs. The short-chain ester homopolymers or copolymers can be prepared by ester interchange from either the dimethyl esters and low molecular weight diols, as above, or from the free acids with the diol acetates. Alternatively, the short-chain ester copolymer can be prepared by direct esterification from appropriate acids, anhydrides, or acid chlorides, e.g., with diols or by such other procedures as reaction of the acids with cyclic ethers or carbonates. This prepolymer can further be prepared by running said process in the presence of a long-chain glycol. The resulting prepolymer is then carried to high molecular weight by distillation of the excess of short-chain diol. This process is known as "polycondensation". During this distillation, additional ester interchange occurs to increase the molecular weight and randomize the distribution of the copolyester units. Optimum results are usually obtained if this final distillation or polycondensation is run at a pressure of not more than 130 Pa and 240°–260° C. over a period of not more than 2 hours in the presence of antioxidants such as symm-di-β-naphthyl-p-phenylenediamine and 1,3,5-trimethyl- 2,4,6-tris[3,5-di-tert.butyl-4-hydroxybenzyl]-benzene- In order to avoid the products being exposed to high temperatures for excessive periods of time with possible irreversible thermal degradation, it is effective to employ a catalyst for the ester interchange reaction. While a wide variety of catalysts may be used, preference is given to organic titanates, such as tetrabutyl titanate used alone or in combination with magnesium or calcium acetate. Complex titanates, such as Mg[HTi(OR)$_6$]$_2$, prepared from alkali or alkaline earth metal alkoxides and titanate esters are also very effective. Inorganic titanates, such as lanthanum titanate, calcium acetate/antimony trioxide mixtures, and lithium and magnesium alkoxides, are representative of other catalysts which may be used.

When use is made of a polyethylene oxide glycol having an average molecular weight <600, the proportion thereof to be incorporated into the copolyetheresters is prohibitively high. For, it has been found that a film made therefrom having a thickness of, say, 35 µm and a water vapor permeability of at least 1000 g/m²/day is not suitable for use in waterproof rainwear on account of its physical properties. Using a polyalkylene oxide glycol having an average molecular weight >3000 may cause problems in the preparation of copolyetheresters due to phase separation.

Generally, optimum results are attained when the long-chain glycol is polyethylene oxide glycol having a molecular weight of 1000 to 3000. It has been found that the use of a long-chain glycol having a molecular weight in the range of 1000 to 2000 results in films of very good properties being obtained when the percentage of short-chain ester units is in the range of 25 to 60 wt. %.

When manufacturing waterproof rainwear, shoes, or mattress covers according to the present invention, very good results are attained with copolyetherester films produced by film blowing and/or flat die extrusion, said films having a water absorption not higher than 20 wt. %, calculated on the weight of the dry films, measured at 23° C. in water in accordance with DIN 53495. Preferred in this case is the use of polymers giving films made by film blowing which have a water absorption not higher than 15 wt. %.

The manufacture of films from the present copolyetheresters is carried out in a manner known per se from the art, as described in Kirk-Othmer, *Encyclopedia of Chemical Technology* 9 (1966), pp. 232–241.

By the film blowing process films having a thickness in the range of 5 to 35 µm may be obtained. Preference, however, is given to flat films obtained by flat die extrusion on a cooled roll. Preferably, in that case, the temperature of the roll is chosen between 45° and 125° C. The films made in the above-described ways generally have a lower water absorption capacity than do films obtained in some other way, e.g., by compression molding. The copolyester film may be attached to the porous textile material in various ways, including by a heat treatment, sewing, or the use of an adhesive. Alternatively, the copolyester film may be enclosed by two layers of textile material, making for a construction of at least three layers. The adhesive to be used is not only dependent on the composition of the copolyetherester, but also on the type of substrate. It has been found that, in general, favorable results are attained by using a bicomponent glue. One component of this glue is formed by a prepolymer with -NCO-containing end groups, the other by a prepolymer containing OH-end groups. The bicomponent glue is discretely applied to the film and/or the cloth from a solution (e.g., in ethyl acetate) with the aid of a screen roll, followed by bonding upon evaporation of the solvent. In this way a windproof material is obtained which has a water vapor permeability of as high as at least 1000, but preferably exceeding 2000 g/m²/day.

The invention will be further elucidated with reference to the following examples, which are not to be construed as limiting in any manner the scope of the invention. All parts and percentages mentioned in the application are by weight, unless otherwise specified.

METHODS USED IN EXAMPLES

The following methods were used to determine the properties of the copolyetherester films and/or the waterproof garments, shoes, tents, mattress covers, and the like manufactured according to the present invention.

A. Determination of absorption in water at 23° C. in accordance with DIN 53495.

B. Determination of water vapor permeability at a water temperature of 30° C. and an air temperature of 21° C. and 60% RH in accordance with ASTM E96-66 (Procedure B).

C. Determination of waterproofness with a modified Sutter's test apparatus and by the Mullin's Burst Test, which two tests are described in British Patent No. 2,024,100. In the Sutter test waterproofness is determined visually. The test procedure includes subjecting the copolyetherester film to a hydrostatic head of 25 cm of water over a period of 20 minutes. In the Mullin's Burst Test waterproofness is also determined visually. This test includes applying a particular pressure for 10 seconds, and subsequently maintaining it for 30 seconds. A superatmospheric pressure level of about 213 kPa (2,1 atmospheres gauge pressure) is used as an acceptance level for the use envisaged.

D. Determination of permanent plastic deformation using the method specified below. A membrane of 25 mm in width with a gauge length of 50 mm is fixed in a draw bench. The strip is elongated 100% at a rate of 100% per minute, which for the aforementioned gauge length corresponds to 50 mm/min. After elongation, the clamp reverts to its starting position. Next, after a 5-minute wait, a second cycle is started. The permanent plastic deformation, which is expressed as the percentage permanently elongated, can be read from the second curve.

E. Determination of tear resistance using an Elmendorf tester in accordance with ASTM D1922.

F. The following stress-strain properties were determined in accordance with ISO 1184:

a) tenacity (T) in longitudinal direction (LD) and in transverse direction (TD), b) elongation at break (EAB) in longitudinal and transverse directions, c) permanent plastic deformation (PPD) in longitudinal and transverse directions.

Example 1

Into a 200 l autoclave were introduced 30.8 kg of the dimethyl ester of 2,6-naphthalene dicarboxylic acid (DM-2,6-NCD), 17.0 kg of 1,4-butane diol, and 17.5 kg of polyethylene oxide glycol having an average molecular weight of 1000. The reaction mixture was heated to 110° C., with stirring, whereupon 15.4 g of tetrabutyl titanate were added, as well as 0.25 kg of 1,3,5-trimethyl-2,4,6-tris[3,5-di-tert.butyl- 4-hydroxybenzyl] as antioxidant and 250 g of $SiO_2$ (as suspension in 1,4-butane diol), so that the finally formed polymer contained 0.5 wt. % of $SiO_2$. Upon a further increase in temperature to 171° C. methanol distilled off, after which the pressure was slowly reduced to 100 Pa and the temperature raised to 248° C. This polycondensation reaction, which lasted 3 to 4 hours, led to copolyester A having a relative viscosity of 2.17 (measured on a concentration of 1.0 g in 100 g of m-cresol at 25° C). Postcondensation in the solid phase resulted in a product having $n_{rel}$=3.58. The water absorption of this product, measured in accordance with DIN 53495 at 23° C., was 17.6%. The percentage of short-chain ester units was 58.7 wt. %. Consequently, the percentage of long-chain ester units was 41.3 wt. %, which corresponds to a polyethylene oxide glycol content of 35 wt. %.

Example 2

In a manner analogous to that indicated in Example 1 there was prepared a copolyetherester B, making use of 24.1 kg of the dimethyl ester of 2,6-naphthalene dicarboxylic acid (DM-2,6-NDC), 13.3 kg of 1,4-butane diol, 12.0 kg of polyethylene oxide glycol having an average molecular weight of 2000, and 12.0 kg of polytetramethylene oxide glycol (pTHF) having an average molecular weight of 1000. The reaction was conducted in the presence of 24.1 g of tetrabutyl titanate and 0.25 kg of 1,3,5-trimethyl-2,4,6tris[3, 5-di-tert.butyl-4-hydroxybenzyl] as antioxidant and 250 g of $SiO_2$ (as suspension in 1,4-butane diol). The polymerization temperature was 246° C. The product had a relative viscosity of 2.50 (measured on a concentration of 1.0 g in 100 g of m-cresol at 25° C.). Postcondensation in the solid phase resulted in a product having $n_{rel}$=4.32. The percentage of short-chain ester units was 44.4, which corresponds to a percentage of long-chain ester units of 55.6. The copolyetherester contained 24.5 wt. % of polyethylene oxide glycol and 24.5 wt. % of pTHF.

Example 3

The postcondensed copolyetheresters A and B were molded into films having the thicknesses listed in the table below. The waterproofness and the water vapor permeability (WVP) of these films were determined at a water temperature of 30° C. and an air temperature of 21° C. at 60% RH in accordance with ASTM E 96-66, Procedure B. All the films withstood the Sutter test and the Mullin's Burst Test. The water vapor permeability result was compared with the results for copolyetherester film S containing 69 wt. % of polybutylene terephthalate (PBT) and polyethylene oxide glycol (PEG) having a number average molecular weight of 4000 (polymer B in the Examples of U.S. Pat. No. 4,493,870), copolyetherester film T containing 43.2 wt. % of polybutylene terephthalate (PBT) and a 25 wt. % content of polyethylene oxide glycol having an average molecular weight of 2000 and 25 wt. % of pTHF having an average molecular weight of 1000, and copolyetherester film U containing 57.0 wt. % of polybutylene terephthalate and polyethylene oxide glycol having a number average molecular weight of 1000. The $n_{rel}$ of copolyetherester T was 2.64; 4.24 after postcondensation in the solid phase. The results are listed in the Table below.

TABLE 1

| Copolyether-ester | wt. % hard seqm. | PEG | film thickn. (in μm) | WVP (g/m²/day) |
|---|---|---|---|---|
| A1 | 58.7 PBN | 35 | 10 | 2247 |
| A2 | 58.7 PBN | 35 | 15 | 2023 |
| U | 57.0 PBT | 38 | 14.7 | 2515 |
| B1 | 44.4 PBN | 24.5 | 13.5 | 2406 |
| B2 | 44.4 PBN | 24.5 | 17.3 | 2331 |
| T | 43.2 PBT | 25 | 10 | 2724 |
| S | 69.0 PBT | 30 | 15 | 2664 |

The data listed in the table above shows that at a similar thickness the copolyetherester films according to the invention (A and B) based on polybutylene-2,6-naphthalene dicarboxylate (PBN) have a WVP of the same order of magnitude as the known copolyetherester films based on polybutylene terephthalate (PBT) with a similar content of polyalkylene oxide glycol.

Example 4

Several of the mechanical properties of the copolyetherester films according to the invention, A (film thicknesses of 10 and 15 μm) and B (film thicknesses of 13.5 and 17.3 μm), were measured and compared with those of the known copolyetherester films S (film thickness 15 μm), U (film thickness 14.7 μm), and T (film thickness 10 μm).

The results are listed in the Table below.

TABLE 2

| Property | | Copolyetherester | | | | | | |
|---|---|---|---|---|---|---|---|---|
| | | A1 | A2 | U | B1 | B2 | T | S |
| Tear resistance (mN/specimen) in accordance with Elmendorf | LD | 4180 | 4496 | — | 3376 | 2560 | 660 | 640 |
| | TD | 3790 | 4592 | — | 2784 | 1968 | 670 | 928 |
| tenacity (T) MPa | LD | 36.9 | 37.2 | 36.6 | 86.6 | 75.1 | 38.2 | 95 |
| | TD | 34.6 | — | 30.6 | 36.1 | 47.3 | 34.9 | 84 |
| Elongation at break (EAB)* | LD | 406 | 540 | 769 | 613 | 727 | 688 | 613 |
| | TD | 669 | — | 622 | 680 | 575 | 751 | 698 |
| permanent plastic deformation (PPD) % | LD | 19.2 | 20.6 | — | 12.1 | 12.4 | 19.2 | 31.2 |
| | TD | 24.8 | 23.7 | — | 16.8 | 15.4 | 22.2 | — |

The data listed in the Table above clearly shows that the tear resistance of the copolyetherester films according to the invention is substantially higher than that of the known copolyetherester films of similar composition. Further, the copolyetherester films according to the invention have significantly lower yield (permanent plastic deformation), which means far better retention of the elastic properties after high load, than is the case with the known copolyetherester films based on polybutylene terephthalate. In consequence, the now proposed copolyetherester films can be used to make waterproof elastic garments.

Example 5

In a manner analogous to that indicated in Example 1, several copolyetheresters were prepared for the manufacture therefrom of films suitable for use according to the invention. In each case the hard segment was composed of polybutylene-2,6-naphthalene dicarboxylate (PBN) or polybutylene terephthalate (PBT), while the long-chain ester units were formed by reacting a mixture of polyethylene oxide glycol having a molecular weight of 2000 (PEG 2000) and polytetramethylene oxide glycol having a molecular weight of 1000 (PTHF 1000). The thus prepared copolyetheresters were molded into plates with the aid of a socalled Collin press, use being made of a 20×20 cm copperplate of 0.5 mm thick with three parallel recesses of 10×70 mm provided therein. In all cases the recesses were filled with 0.38 g of copolyetherester granules, after which the whole was placed in the press between two plates of TEFLON fluoropolymer and heated to 280° C. at a pressure which was gradually increased from 10 bar during the first two minutes to 40 bar during the next minute, 60 bar during the minute after that, and 160 bar during the final minute. The pressure was then reduced to 10 bar and there was cooling with water for three minutes. The plates obtained after cooling were fixed in an Instron tensile tester, the gauge length being 50 mm, after which there was 100% elongation over a period of one minute. After a five minute wait, the procedure was repeated. The results of the measurements are listed in the Table below.

TABLE 3

| | Copolyetherester composition | | | Permanent plastic deformation |
|---|---|---|---|---|
| | wt. % | weight percentage polyether | | |
| No. | hard segment | PEG 2000 | pTHF 1000 | % |
| 1. | 44 PBN | 25 | 25 | 24.5 |
| 2. | 43 PBN | 20 | 30 | 23 |
| 3. | 37 PBN | 20 | 35 | 21 |
| 4. | 31 PBN | 20 | 40 | 20 |
| 5. | 36.5 PBN | 25 | 30 | 25 |
| 6. | 31 PBN | 25 | 35 | 22 |
| 7. | 25.5 PBN | 25 | 40 | 20 |
| 8. | 32 PBN | 30 | 30 | 21 |
| 9. | 26 PBN | 30 | 35 | 20 |
| 10. | 20 PBN | 30 | 40 | 16 |
| 11. | 45.6 PBT | 25 | 25 | 30 |

The data in the Table above clearly shows that copolyetheresters based on polybutylene-2,6-naphthalene dicarboxylate (PBN) exhibit a significantly lower permanent plastic deformation than copolyetheresters of similar composition based on polybutylene terephthalate (copolyetherester no. 11).

The foregoing data should not be construed in a limiting sense since it is being set forth to exemplify only certain embodiments of the invention. The scope of protection sought is set forth in the claims which follow.

We claim:

1. Use of a laminate of a textile material covered with a copolyetherester film having a water vapor transmission rate of at least 1000 g/m²/day for the manufacture therefrom of waterproof rainwear, shoes, tents, or mattress covers, or for the complete covering therewith of molded articles of foam rubber for use in chairs or mattresses, the copolyetherester being composed of a plurality of recurrent intralinear long-chain ester units and short-chain ester units which are randomly joined head-to-tail through ester bonds, the long-chain ester units corresponding to the formula:

and the short-chain ester units corresponding to the formula:

where G is a divalent radical remaining after the removal of terminal hydroxyl groups from at least one long-chain glycol having an average molecular weight in the range of 600 to 4000 and an atomic ratio of carbon to oxygen in the range of 2.0 to 4.3, at least 20 wt. % of the long-chain glycol having a carbon to oxygen ratio in the range of 2.0 to 2.4, and 15–45 wt. % of said glycol being part of the copolyetherester, R is a divalent radical remaining after the removal of carboxyl groups from at least one dicarboxylic acid having a molecular weight of less than 300, and D is a divalent radical remaining after the removal of hydroxyl groups from at least one diol having a molecular weight of less than 250, wherein at least 70 mole % of the dicarboxylic acid employed consists of 2,6-naphthalene dicarboxylic acid or its ester forming equivalents and at least 70 mole % of the low molecular weight diol consists of 1,4-butane diol or its ester forming equivalents, with the sum of the mole percentage of dicarboxylic acid which is not 2,6-naphthalene dicarboxylic acid or its ester forming equivalents and the mole percentage of low molecular weight diol which is not 1,4-butane diol or its ester forming equivalents being not more than 30, and the short-chain ester units make up 25–60 wt. % of the copolyetherester.

2. Use according to claim 1, characterised in that the thickness of the polymer film is in the range of 5 to 25μ.

3. Use according to claim 1, characterised in that the short-chain ester units consist substantially of polybutylene naphthalate units.

4. Use according to claim 1, characterised in that the long-chain glycol is polyethylene oxide glycol having an average molecular weight of 1000 to 3000; and 5. Use according to claim 1, characterised in that the long-chain glycol is composed of a mixture of polyethylene oxide glycol having a molecular weight in the range of 1000 to 2000 and polytetramethylene oxide glycol having a molecular weight 1000.

* * * * *